United States Patent
Walls et al.

(10) Patent No.: US 9,860,344 B2
(45) Date of Patent: Jan. 2, 2018

(54) SELF-MANAGEMENT OF LOCAL RESOURCES ALLOCATED REMOTELY

(75) Inventors: Jeffrey Joel Walls, F. Collins, CO (US); Byron A. Alcorn, F. Collins, CO (US); Thomas J. Flynn, Houston, TX (US); Roland M. Hochmuth, Ft. Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1424 days.

(21) Appl. No.: 13/000,622

(22) PCT Filed: Jun. 26, 2008

(86) PCT No.: PCT/US2008/068314
§ 371 (c)(1),
(2), (4) Date: Dec. 21, 2010

(87) PCT Pub. No.: WO2009/157933
PCT Pub. Date: Dec. 30, 2009

(65) Prior Publication Data
US 2011/0107229 A1    May 5, 2011

(51) Int. Cl.
*G06F 15/173* (2006.01)
*H04L 29/08* (2006.01)
(Continued)

(52) U.S. Cl.
CPC ............ *H04L 67/36* (2013.01); *G06F 3/1423* (2013.01); *G06F 3/1446* (2013.01); *G09G 5/14* (2013.01);
(Continued)

(58) Field of Classification Search
None
See application file for complete search history.

(56) References Cited

U.S. PATENT DOCUMENTS

| | | | | |
|---|---|---|---|---|
| 5,539,872 | A | * | 7/1996 | Mintz et al. .................. 715/810 |
| 5,819,284 | A | * | 10/1998 | Farber et al. ................. 709/203 |

(Continued)

FOREIGN PATENT DOCUMENTS

| | | |
|---|---|---|
| CN | 1722908 | 1/2006 |
| KR | 1019980069962 | 10/1998 |
| KR | 1020010092447 | 10/2001 |

OTHER PUBLICATIONS

ISA, International Search Report and Written Opinion, App. No. PCT/US2008/068314, filed Jun. 26, 2008, dated Jan. 30, 2009.

(Continued)

*Primary Examiner* — Joseph E Avellino
*Assistant Examiner* — Phyllis A Book
(74) *Attorney, Agent, or Firm* — HP Inc. Patent Department

(57) ABSTRACT

Systems, methods, and other embodiments associated with persisting information concerning per-user, per-connection display configuration control are described. One example method includes identifying services that provide outputs to be displayed to an identified user on displays available to the identified user. Services are provided by remotely located computers. The example method may also include establishing a display control parameter based on a stored mapping that persistently relates services, outputs, displays, and users. The mapping stores information concerning the parameter as configured by the identified user during a previous session. The example method may also include controlling the display of the output on the display based on the parameter.

17 Claims, 8 Drawing Sheets

(51) Int. Cl.
*G06F 3/14* (2006.01)
*G09G 5/14* (2006.01)

(52) U.S. Cl.
CPC .............. *G09G 2320/0606* (2013.01); *G09G 2340/0407* (2013.01); *G09G 2340/0464* (2013.01); *G09G 2370/20* (2013.01)

(56) References Cited

U.S. PATENT DOCUMENTS

| | | | |
|---|---|---|---|
| 6,968,511 B1* | 11/2005 | Robertson et al. | 715/835 |
| 7,081,904 B2* | 7/2006 | Zoller | G06F 3/0481 |
| | | | 345/619 |
| 7,395,497 B1* | 7/2008 | Chaulk | G06Q 10/00 |
| | | | 707/999.001 |
| 7,440,560 B1* | 10/2008 | Barry | H04L 12/5692 |
| | | | 379/201.01 |
| 7,451,154 B2* | 11/2008 | Solomon | |
| 7,526,542 B2* | 4/2009 | Booman et al. | 709/223 |
| 7,613,995 B2* | 11/2009 | Wen | G06F 17/218 |
| | | | 715/209 |
| 7,792,362 B2* | 9/2010 | Berkner | G06F 17/30905 |
| | | | 382/176 |
| 8,321,535 B2* | 11/2012 | Desai | G06F 17/30861 |
| | | | 709/220 |
| 8,448,067 B2* | 5/2013 | Cerny et al. | 715/719 |
| 2002/0054112 A1* | 5/2002 | Hasegawa | G06F 3/04845 |
| | | | 715/764 |
| 2002/0135605 A1* | 9/2002 | Kim | G09G 1/167 |
| | | | 345/698 |
| 2003/0226113 A1* | 12/2003 | Altman | G06F 3/0481 |
| | | | 715/249 |
| 2006/0075106 A1* | 4/2006 | Hochmuth | H04L 67/125 |
| | | | 709/227 |
| 2006/0088149 A1* | 4/2006 | Sung | 379/142.16 |
| 2007/0050710 A1* | 3/2007 | Redekop | 715/523 |
| 2007/0276875 A1* | 11/2007 | Brunswig | G06F 8/38 |
| 2008/0216146 A1* | 9/2008 | Gautier | H04L 29/06 |
| | | | 725/139 |
| 2009/0013255 A1* | 1/2009 | Yuschik et al. | 715/728 |
| 2009/0055745 A1* | 2/2009 | Christiansen | H04N 9/8205 |
| | | | 715/723 |
| 2009/0213269 A1* | 8/2009 | Dozoretz et al. | 348/563 |

OTHER PUBLICATIONS

Supplementary European Search Report, dated Dec. 5, 2013, EP Patent Application No. 08772015.7.
European Patent Office, Communication pursuant to Article 94(3) EPC for EP Appl. No. 08772015.7 dated Feb. 2, 2016 (6 pages).

* cited by examiner

SELF-MANAGEMENT OF LOCAL RESOURCES ALLOCATED REMOTELY

COPYRIGHT NOTICE

A portion of the disclosure of this patent document contains material subject to copyright protection. The copyright owner has no objection to the facsimile reproduction of the patent document or the patent disclosure as it appears in the Patent and Trademark Office patent file or records, but otherwise reserves all copyright rights whatsoever.

BACKGROUND

Conventionally, a worker (e.g., trader, FBI agent) may have had all the computer components (e.g., central processing unit (CPU), memory, long term storage (e.g., disk, tape), display) for their computer located on their desktop. However, this may have created issues associated with security, air conditioning, real estate consumption, electrical capacity, upgradeability, administrative control, and so on. Additionally, this may have limited mobility. Thus, computer resources (e.g., processors, memory, storage) are increasingly being located remotely from where the services (e.g., applications, screen displays, information displays) are provided. For example, computer resources are being moved from employee desktops to centralized locations (e.g., data center, "back room") to which the worker can connect. In particular, computer resources associated with highly specialized environments (e.g., trading desk, military, chip fabrication, tornado chasing, air traffic control, law enforcement) are being relocated.

Workers in these environments tend to move from location to location, sometimes from minute to minute. For example, a commodities trader may work Monday in London, fly to New York, work Tuesday in New York, fly to Chicago, work Wednesday in Chicago, fly to Aspen, ski all day Thursday, fly to Seattle, and work Friday in Seattle before returning to Aspen for the weekend. An FBI agent working an interstate kidnapping case may similarly relocate frequently. In a less intense scenario, a trader may simply move from desk to desk while working all week in New York. Additionally, workers in these specialized environments often have customized setups and configurations with which they are familiar and with which they would prefer to interact, regardless of the physical apparatus in front of them. For example, a certain trader may desire access to two services and would prefer for them to be available in a certain arrangement. These two services may be provided by two different computers at the back end(s) of the organization.

As the worker moves from location to location, the size, number, and capabilities of displays available may change. For example, a first desk may have one large display available, a second desk may have three medium displays available, and a third desk may have eight smaller displays arranged in a grid available. However, in two different geographic locations (e.g., Boston, N.Y.), a user may have exactly the same set of displays available. In one example, the layout of monitor displays and the mapping of resources to monitors determines the usability of the system and affects the productivity of the user. When highly valued assets (e.g., combat air traffic controllers) are required to work in difficult environments (e.g., active battlefield) where different sets of display hardware are available, then usability and productivity may be serious considerations. However, conventional systems may have forced a user to adapt to the available hardware rather than having the available hardware adapt to the user.

To reiterate, at one end (e.g., "back end", "server side"), a set of relocated computing resources may provide a resource pool that provides a set of services. At different times, a service may be provided by different computers. At another end (e.g.,"front end", "client side"), a set of display hardware provides a display environment with which a "custom display configuration user" interacts. Conventionally, it has been difficult, if possible at all, to establish and/or maintain mappings between a back end(s), front ends, and users while maintaining security and maintaining contact with the reality of the physical situation with which the user is confronted.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
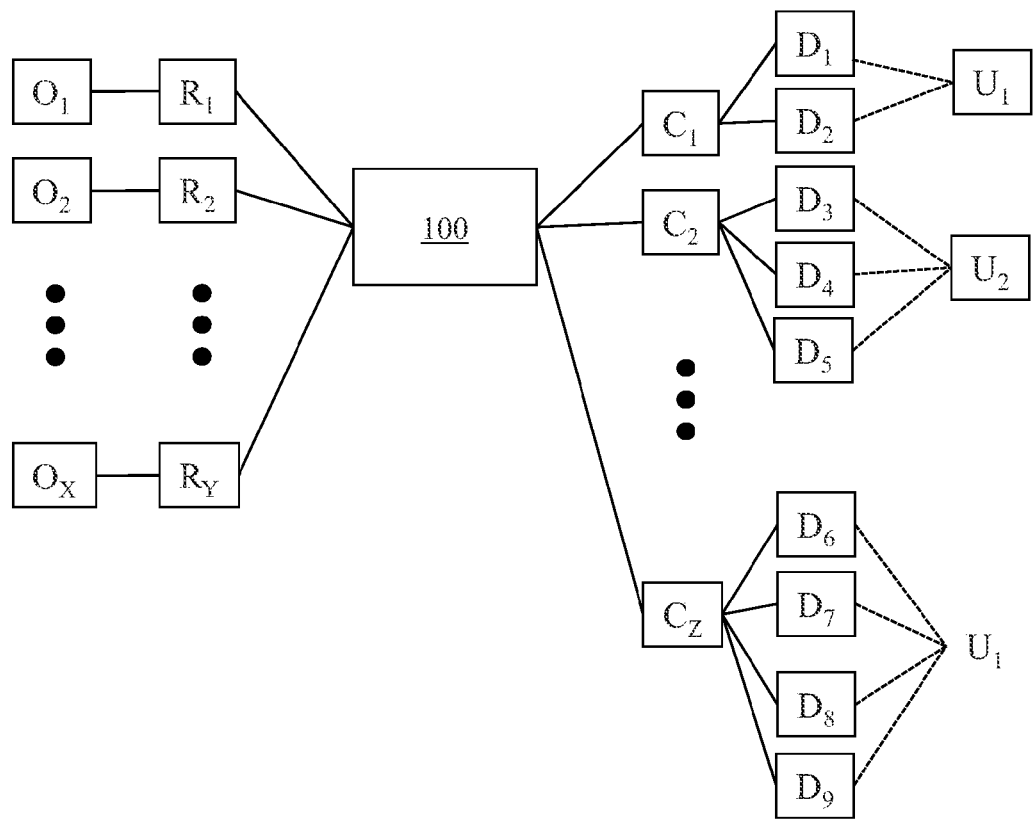
FIG. 1 illustrates an example set of resources, physical locations, and users for which mappings are to be maintained to facilitate the self-management of local resources allocated remotely.

Example systems and methods provide users with the ability to self-manage resource mappings while maintaining security. Example systems and methods provide a "remoting solution" that facilitates managing the connection of back-end logical displays to front-end physical displays according to desired configurations associated with a user. Example systems and methods operate at the "per-user per-session" level, rather than at the individual application level, and thus facilitate arranging entire screens of information, rather than portions of screens (e.g., windows).

Example systems and methods employ a monitor layout identifier (MLI). This MLI provides a tag for a client(s) that defines how a monitor(s) is to be configured on a system. A (user, MLI) pair determines the layout and configuration information to be employed to configure monitors on a system. If a client is not associated with an MLI, then a default may be used. Using MLIs allows an enterprise with thousands of clients to have just a small set of monitor layouts and MLIs. A user may be assigned resources based on a (user, MLI) mapping. Example systems also facilitate a user updating connection information for an MLI for a client they are using. In particular, a user with "administrative" privileges may be allowed to change an MLI. However this may change the identifier on the client and for future users.

Consider a first computer providing a first service(s). Conventionally this computer may have been directly attached to a monitor(s) by, for example, a single cable. A user could thus manipulate the presentation on the monitor to match their needs on a per-session basis. The user may even have been able to store their preferences on the computer. Now consider a second computer that also provides a service(s) that the user may also want to employ for their job. The second computer may also have a monitor(s) attached directly to it and thus once again the user could likely manipulate the display to match their needs and perhaps store those preferences on the second computer. If the user went to a different desk that had two different computers then the user would have to repeat reconfiguring those two different computers to match their needs. If a different user sat down at the first two computers, that different user might not like the configuration on those first two computers and may reconfigure it to their needs. When the first user went back to the first two computers, the first user may have become upset that their preferences were changed by some other user.

In the relocating environment, a monitor(s) associated with a computer may not be directly attached to the computer but rather may be remotely connected through, for example, a computer network. Additionally, as described above, the user may move from location to location and thus experience different sets of displays for receiving presentations from the computers to which they connect. Example systems and methods facilitate establishing and maintaining mappings between computers and displays given the individual needs of a user and the display resources available to the user at a given time in a given location. These mappings relate resources (e.g., computers), the output produced by the resource (e.g., stock trading information), the display capability of a location (e.g., number of monitors, monitor capability), and a user configuration. The resources, outputs, and display capability can be determined on an enterprise level. The user configuration can be determined on a per-user level, on a per-user, per-location level, on a per-user, per-session level, and/or on a per-user, per-location, per-session level. As used in this paragraph, "location" may refer to a set of available displays (e.g., a place where four monitors of a certain model are available) rather than to a geographical location (e.g., Toronto).

The mappings facilitate persistent configurability. For example, the mappings facilitate managing connections between a set of displays connected to a set of computing devices, where the displays and computing devices are used by users having custom configuration preferences. Since a user may configure a session at a location, the mappings may be based, at least in part, on a capture of a user-configured session associated with members of the set of displays. The persistent configurability facilitates providing remote graphics where the remote displays replicate, as constrained by the display capability, what would be presented if monitors having desired characteristics were directly connected to the computers providing the services.

Several examples illustrate different scenarios that example systems and methods may confront. In these examples, it is to be appreciated that the item displayed by a computer is an entire session output that may include output from a set of applications, from a set of widgets, and so on, and not just the output associated with a single application. It is also to be appreciated that display parameters that are to be manipulated may include the horizontal (x) and vertical (y) positioning of a session display on a monitor(s), along with the width (w) and height (h) of the session display on a monitor(s). The display parameters may be referred to as "presentation aspects" that may be collectively specified using a vector (e.g., (x, y, w, h)). While a vector with four display parameters is described, it is to be appreciated that a greater and/or lesser set of parameters may be included in a presentation aspect vector associated with a mapping. The mapping relates computing resources having a set of logical graphical displays to a virtual display space made up of a set of physical displays.

In a first, simplest case, the set of logical graphical displays are mapped to a virtual display space having an exact match of physical displays to logical displays. For example, a user may connect to two computers, each of which produces an output. A user may desire to have the presentation from these two computers displayed side-by-side on two monitors and to have the presentation consume one hundred percent of the monitor space. In the simplest case the user will have connected to the two computers from a remote location having two displays available side-by-side, where the display capability meets or exceeds the desired capability for the presentations. In this case, the presentation from a first computer may be displayed on the "left" monitor with a desired (x, y, w, h) configuration while the presentation from the second computer may be displayed on the "right" monitor with a desired (x, y, w, h).

In a second scenario, the user may have connected to the two computers from a location having two displays available, each of whose capability meets or exceeds the desired presentation parameters. However, the displays may be stacked on top of each other, not arranged side-by-side. In this case, a mapping may control which of the top and bottom displays are associated with the "left" computer presentation and the "right" computer presentation.

In another scenario, the user may have connected to the two computers from a location having nine small displays available, none of which meets the capacity of either computer presentation display as desired by the user. However, the nine displays may be arranged in a 3×3 grid whose total capacity meets or exceeds the total capacity desired by the user for the two presentations. In this case, a mapping may control where and how to place each of the two displays on members of the 3×3 grid to achieve acceptable presentations.

In another scenario, a user may have connected to the two computers from a location having two side-by-side monitors, neither of which meets the desired parameters of the two computer presentations as desired by the user. In this case, a mapping may control how to relocate and/or resize the displays from the two computers based on the less than desired display capacity. For example, presentations may be shrunk to fit into the available screen real estate, presentations may be overlapped, and so on.

It is to be appreciated that example systems may be confronted with these and other scenarios, and that multiple scenarios may be experienced by a single user, perhaps in a single day. FIG. 1 illustrates an example set of resources (e.g., $R_1, R_2, \ldots R_Y$) that provide a set of outputs (e.g., $O_1, O_2, \ldots O_X$) that may be presented at a set of physical locations connected to the resources by a set of connections (e.g., $C_1, C_2, \ldots C_Z$). A connection may be associated with a number of displays. For example, $C_1$ is illustrated being associated with two displays $D_1$ and $D_2$, $C_2$ is illustrated being associated with three displays $D_3$ $D_4$, and $D_5$, and $C_Z$ is illustrated being associated with four displays $D_6, D_7, D_8, D_9$). Recall that a user may move from location to location. Therefore, FIG. 1 also illustrates two users ($U_1, U_2$) accessing resources associated with outputs through different connections. System 100 facilitates the self-management of local resources allocated remotely. System 100 facilitates establishing and maintaining mappings using different approaches. For example, initially, default mappings and layouts may be established that provide acceptable presentations for many different users. While no presentation may be ideal or one hundred percent custom to any user, a wide array of users may be satisfied with the default mappings. These mappings may be applied to a class of users. Additionally, and/or alternatively, default mappings and layouts may be established that provide acceptable presentations for many different locations.

While default mappings facilitate providing some acceptable presentations, users may desire more custom presentations. Thus, example systems and methods facilitate establishing, maintaining, and/or refining mappings based on user desires. In one example, a user may re-arrange presentations on the monitors available at a location and then "push" this information to a self-management logic. The self-management logic may capture the presentation information and then create and/or update a mapping between the computer resources, the display monitors, and the user. The captured presentation information may include the (x, y, w, h) for the different presentations on the different monitors as established by the user.

Note that the re-arranging and capture can be done at the front end by a user without interfacing with a conventional arrangement tool. The user can re-arrange their screens as desired and submit a request to have that arrangement recorded for that user for that set of available display hardware. Conventionally, to the extent that any preferences were recorded at all in a relocation environment, a user may have had to enter presentation parameters into a web-based tool to have those preferences recorded. Example systems and methods automatically capture preferences based on arrangements made by a user at a physical location while accessing desired services and/or resources.

A user can manage and store a rich set of parameters. For example, a user may manage the number of sessions (e.g., remote connections) and to which machines or resources they are connected. Additionally, the user may manage and store connection parameters including, for example, identifying a session having a remote USB connection. The user may also manage and store "display" parameters including, for example, the x,y position of a session(s) and/or the resolution of a session(s). A user may even manage and store information describing and/or controlling which session policies provide policy choices for a global item (e.g., log file location), Data associated with this rich set of parameters may be stored remotely since local clients may not be changeable.

The next time the user connects to those resources from that physical location, the mappings can be consulted to determine where and how to display the presentations associated with the resources in light of the display hardware available at that location. If the user connects to those resources from a different physical location having different display hardware available, then the user may arrange the presentations as desired and save an additional mapping that is associated with that user, that set of resource presentations, and that set of display hardware. When the user initially connects from a new location for which there is no mapping, example systems and methods may locate resource presentations based on a default mapping and/or based on another stored mapping from which inferences can be drawn with respect to the available display hardware.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
PCI: peripheral component interconnect.
PCIE: PCI express.
RAM: random access memory.
DRAM: dynamic RAM.
SRAM: synchronous RAM.
ROM: read only memory.
EEPROM: electrically erasable PROM.
USB: universal serial bus.
XML: extensible markup language.
WAN: wide area network.

XML refers to extensible markup language. XML is a document format, a meta-markup language for text documents. XML documents are trees that start at a root. XML documents include elements. An element can be defined generically and have a particular instance(s). An instance of an element has "content" (e.g., a value(s)). XML elements can have attributes. An attribute is a name-value pair attached to the element start tag. XML Schemas describe allowed content of XML documents conforming to a particular XML vocabulary.

"Computer component", as used herein, refers to a computer-related entity (e.g., hardware, firmware, software in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication", as used herein, refers to a communication between computing devices (e.g., computer, personal digital assistant, cellular telephone) and can be, for example, a network transfer, a file transfer, an applet transfer, an email, an HTTP transfer, and so on. A computer communication can occur across, for example, a wireless system (e.g., IEEE 802.11), an Ethernet system (e.g., IEEE 802.3), a token ring system (e.g., IEEE 802.5), a LAN, a WAN, a point-to-point system, a circuit switching system, a packet switching system, and so on.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a data structure (e.g. a list, a queue, a heap, a tree) a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, and so on, that can be received, transmitted and/or detected.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, logics, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is to be appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. For purposes of simplicity of explanation, the illustrated methodologies are shown and described as a series of blocks. However, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 2:
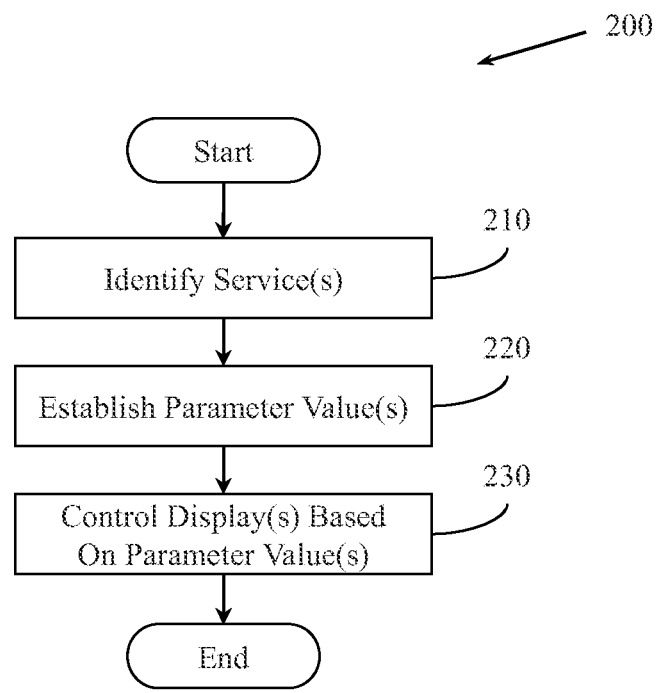
FIG. 2 illustrates an example method associated with the self-management of local resources allocated remotely.

FIG. 2 illustrates a method 200 associated with the self-management of local resources allocated remotely. Method 200 may include, at 210, identifying a set of services to provide a set of outputs. Recall that the services may be provided by different computers at different times. The services may include, for example, trading applications and thus the outputs may include, for example, equity prices, debt prices, news, and so on. Method 200 may also include, at 210, identifying a set of displays on which the outputs are to be displayed to an identified user. The displays will be remote from (e.g., not directly attached to) the computers providing the services. A service is to be provided by a computer located remote from the set of displays. For example, the displays may be located on a trader desktop on a Wall Street office while the services are provided by computers located in Jersey City, N.J. Being "remote" does not require being across the Hudson River in another state. A computer may be "remote" from a display on which an output associated with a service provided by the computer when the computer is not directly attached to the display. Thus, a computer located down the hall in an air conditioned server room is remote, as is a computer located twenty miles away. The identified user may be identified as an individual (e.g., John Smith) and/or as a member of a class of users (e.g., municipal bond trader).

Method 200 may also include, at 220, establishing a value for a parameter associated with displaying a member of the set of outputs on a member of the set of displays to the identified user. The value may depend, at least in part, on a stored mapping that persistently relates the set of services, the set of outputs, the set of displays, and the identified user. The stored mapping stores information concerning the parameter as configured by the identified user while previously viewing the member of the set of outputs on the member of the set of displays and/or on an identical set of displays. This may be referred to as a "session capture" or "configuration capture". As described below, the stored mapping may have information pushed into it in response to, for example, a user action (e.g., pressing "Save Configuration") key. Also as described below, the stored mapping may pull information into it in response to, for example, detecting a re-arranging of outputs on displays by a user. The stored mapping may be based, at least in part, on the monitor layout identifier (MLI) described above. In one example, the mapping may be a (user, MLI) mapping.

In one example, the mapping includes an XML attribute-value pair. While an XML storage scheme is described, it is to be appreciated that the mapping may be stored in other ways including, for example, as an entry in a table, as a record in a database, and so on. In one example, a member of the set of outputs includes a complete set of graphical presentations produced by a computer, where the complete set of graphical presentations includes an application output, a gadget output, a widget output, a frame, a window, and so on.

Method 200 may also include, at 230, controlling the display of the member of the set of outputs on the member of the set of displays based, at least in part, on the parameter. In one example, the value for the parameter controls the horizontal position and the vertical position of an output on a display. In another example, the value for the parameter also controls the width and height of the output on the display. In different examples the parameter may be provided as a vector with several values. For example, the vector may include a display identifier, an x coordinate, a y coordinate, a width value, and a height value. While x, y, width, and height, values are described, it is to be appreciated that the parameter may be associated with a greater and/or lesser number and type of values. In one example, the identified user may never have connected to the set of resources from this set of displays. In this case, the value for the parameter may be based, at least in part, on a default stored mapping that persistently relates the set of services, the set of outputs, the set of displays, and the identified user. In another example, the identified user may never have connected from this set of displays but may have connected from an identical set of displays in another location (e.g., adjacent desk, identical franchise). In this case, while a mapping for this set of displays in this location may not be available, a mapping for this set of displays in another location from which the user has connected may be available and thus the parameter value may be based, at least in part, on this related mapping. This example illustrates how a connection is defined at least in part by the set of displays available to the connection.

While FIG. 2 illustrates various actions occurring in serial, it is to be appreciated that various actions illustrated in FIG. 2 could occur substantially in parallel. By way of illustration, a first process could identify services, a second process could establish parameter values, and a third process could control displays based on parameter values. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform the method described above. While executable instructions associated with the above method are described as being stored on a computer-readable medium, it is to be appreciated that executable instructions associated with other example methods described herein may also be stored on a computer-readable medium.

Figure 3:
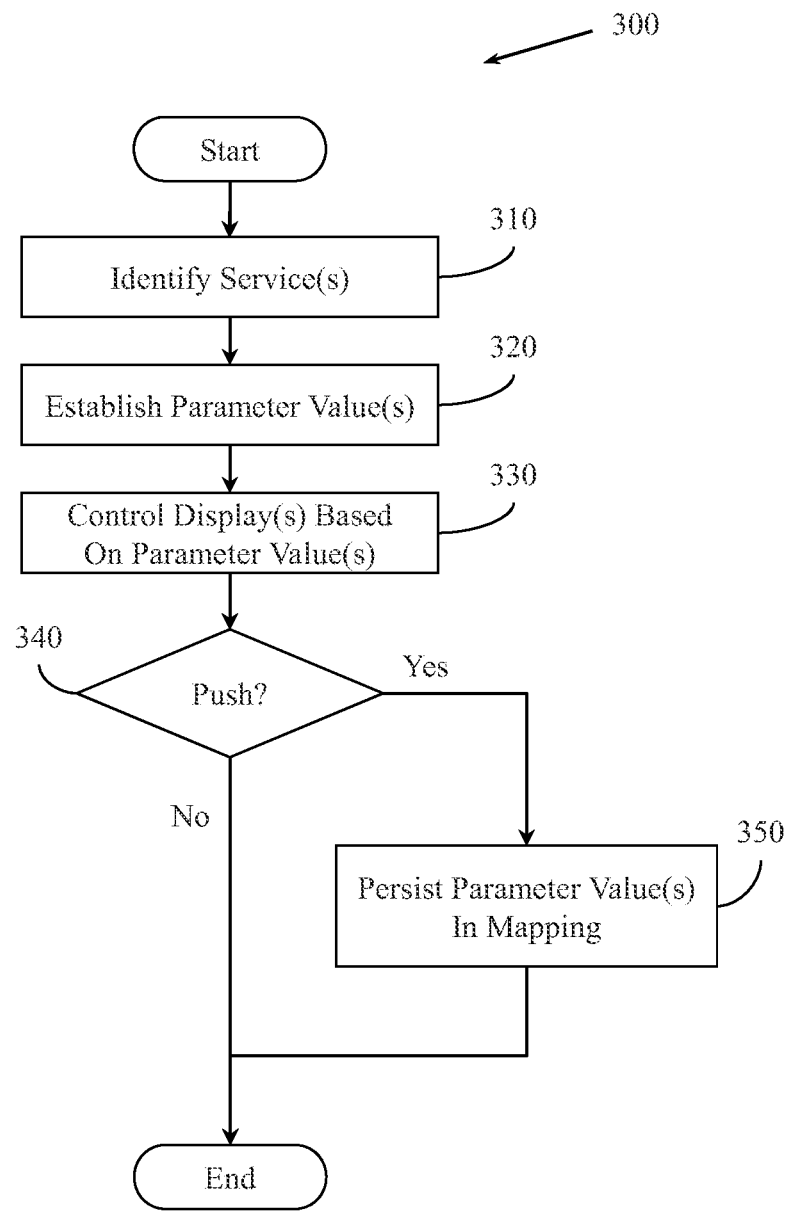
FIG. 3 illustrates an example method associated with the self-management of local resources allocated remotely.

FIG. 3 illustrates a method 300 associated with the self-management of local resources allocated remotely. Method 300 includes several actions similar to those described in connection with method 200 (FIG. 2). For example, method 300 includes identifying services at 310, establishing parameter values at 320, and controlling displays at 330. However, method 300 may include additional actions. For example, method 300 includes, at 340, determining whether to push a value associated with a user configured arrangement into a mapping. If the determination is Yes, then method 300 proceeds, at 350, to push the value for the parameter into the stored mapping. In one example, the determination at 340 may depend upon detecting a user control signal concerning saving the value for the parameter. The user control signal may be generated by a user after re-arranging outputs on available displays. For example, a user may place a first output on a first display at a first x,y location and may place a second output on a second display at a second x,y location. After realizing that the arrangement is satisfactory, the user may cause the arrangement data (e.g., display number, output number, x, y) to be captured and pushed to a mapping logic to be persisted. In this way, the next time the user returns to the capturing location, the same set of outputs can be arranged on the same set of displays at the same x,y locations as controlled by a mapping built from the pushed information. Method 300 includes the user taking an active step to save a configuration. Method 400 does not.

Figure 4:
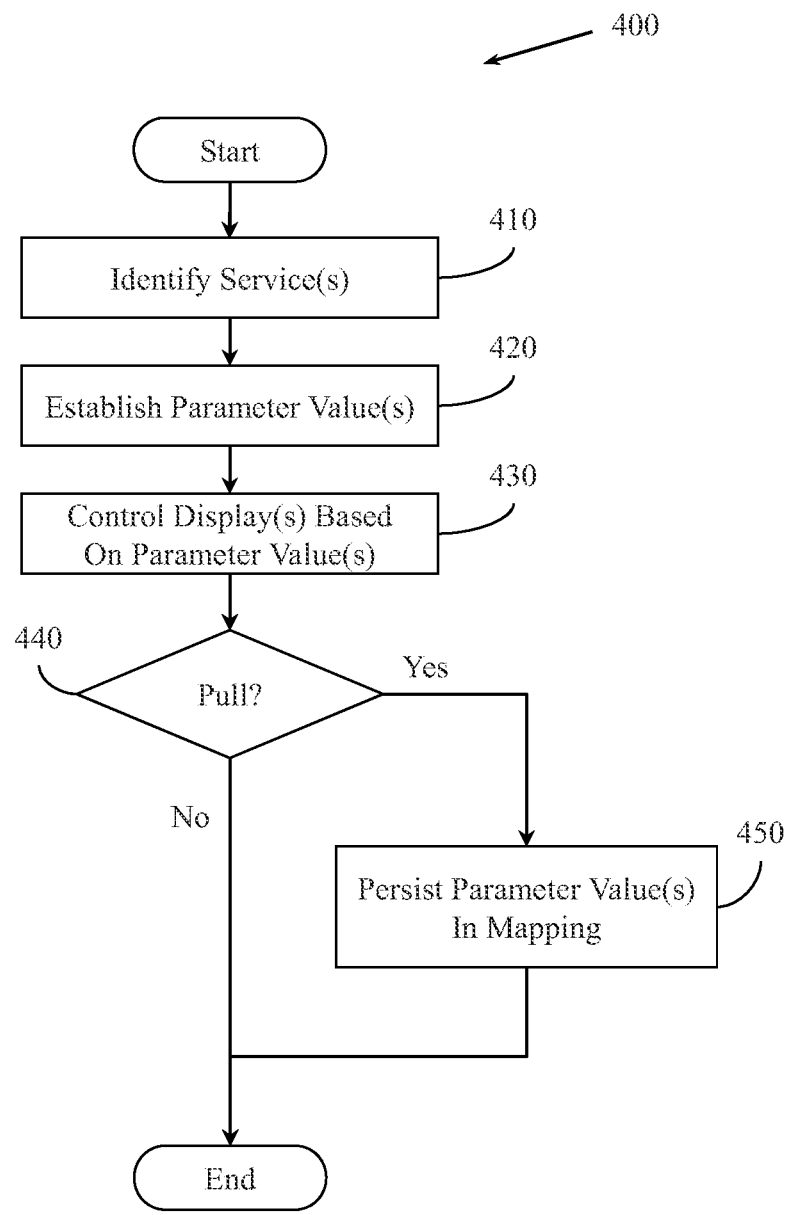
FIG. 4 illustrates an example method associated with the self-management of local resources allocated remotely.

FIG. 4 illustrates a method 400 associated with the self-management of local resources allocated remotely. Method 400 includes several actions similar to those described in connection with method 300 (FIG. 3). For example, method 400 includes identifying services at 410, establishing parameter values at 420, and controlling displays at 430. However, method 400 may include additional actions. For example, method 400 includes, at 440, determining whether to pull a value associated with a user configured arrangement into a mapping. If the determination is Yes, then method 400 proceeds, at 450, to pull the value for the parameter into the stored mapping. In one example, the determination at 440 may depend on detecting a configuration of the parameter by the identified user while viewing the member of the set of outputs on the member of the set of displays. For example, when a local system detects a reconfiguration of outputs on its displays, it may generate an interrupt, provide a signal, make a method call, and so on, that can be received by method 400 to resolve determination 440. The determination may involve more than just identifying that a re-arrangement has occurred. For example, the determination may include consulting a hierarchy of information that controls, at least in part, how outputs may be re-arranged.

Thus, method 200 (FIG. 2), method 300 (FIG. 3), and/or method 400 (FIG. 4) may also include an additional action. For example, these methods may include maintaining a hierarchy of information concerning parameters associated with controlling the display of outputs on displays associated with identified users. In one example, the hierarchy includes an administrative level, an access device level, and a user settings level.

Figure 5:
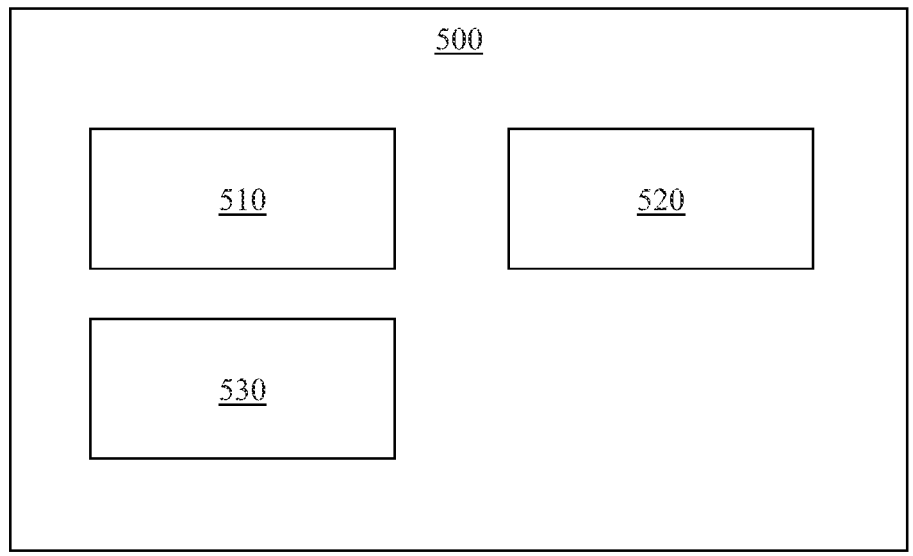
FIG. 5 illustrates an example system associated with the self-management of local resources allocated remotely.

FIG. 5 illustrates a system 500 associated with the self-management of local resources allocated remotely. System 500 may be implemented in a single computer and/or may be implemented in a set of distributed computers. System 500 includes a set of logics. While the logics are illustrated as separate elements, in different examples the logics may be combined into a lesser number of logics or distributed into a greater number of logics.

System 500 includes a connection logic 510 to identify a connection to a set of services being requested by a user. In one example, the connection logic 510 is to identify the connection as being associated with an individual user and/or a user that is a member of a class of users. The user may be, for example, an FBI agent. The FBI agent may be from a first office (e.g., Cleveland) but may be working in a second office (e.g., Cincinnati). In both offices the FBI agent may want to access a missing persons service and a mapping service. In Cleveland, FBI agent desks may be configured with a single large display while in Cincinnati FBI agent desks may be configured with a grid of smaller displays. However, it may be desirable to have the agent see as close an approximation as possible to a "standard" configuration regardless of whether they are in Cleveland or Cincinnati. Thus, the connection logic 510 may identify the FBI agent making a request to connect to the missing persons service and the mapping service.

System 500 may also include a remote access logic 520 to identify a user requesting the connection. The remote access logic 520 may also identify a set of computers to provide the set of services. Recall that when computing resources are relocated, a pool of resources may be available to provide requested services. Thus, the remote access logic 520 may identify that for this connection the missing persons service will be provided from a computer in Philadelphia while the mapping service may be provided by a computer located in San Francisco. In different connections, different computers may provide the services. The remote access logic 520 may also identify a set of physical displays upon which outputs from the set of services are to be displayed at the location to the user. In one example, the remote access logic 520 may have enterprise-wide information available and may already know what displays are available at the physical location from which the FBI agent is making the request. In another example, the remote access logic 520 may query the location to determine the available displays. One skilled in the art will appreciate that identifying the available displays may be performed in different manners.

System 500 may also include a mapping logic 530 to provide a value for a set of display parameters from a persistent mapping that relates the user, the set of services, and the set of physical displays. The persistent mapping may include at least one value associated with a capture of a previous connection by the user to the set of services from the location and/or from an identical set of displays. The persistent mapping may be based, at least in part, on the MLI described above. For example, the mapping may be a (user, MLI) pair. If no user-specific, connection-specific mapping is available, then mapping logic 530 may resort to a default mapping available for a class of users, for the location, for the combination of outputs requested, and so on. Additionally, while the FBI agent may not have connected from Cincinnati previously, the FBI agent may have connected from Indianapolis, which may have the exact same displays available as Cincinnati. Thus, a mapping for a set of displays, rather than for a set of displays in one exact location, may be stored.

In one example, the mapping logic 530 is to manipulate the persistent mapping in response to receiving a control signal from the user. For example, a user may reconfigure a set of outputs and press a "Save Configuration" button or choose a "Save Layout" entry from a memory, and so on. The control signal may indicate a display parameter(s) to retrieve from the current arrangement of outputs displayed to the user at the location. The display parameters may be associated with different properties. For example, the properties may include a display identifier, a horizontal position identifier, a vertical position identifier, a width identifier, a height identifier, a resolution identifier, and so on.

Figure 6:
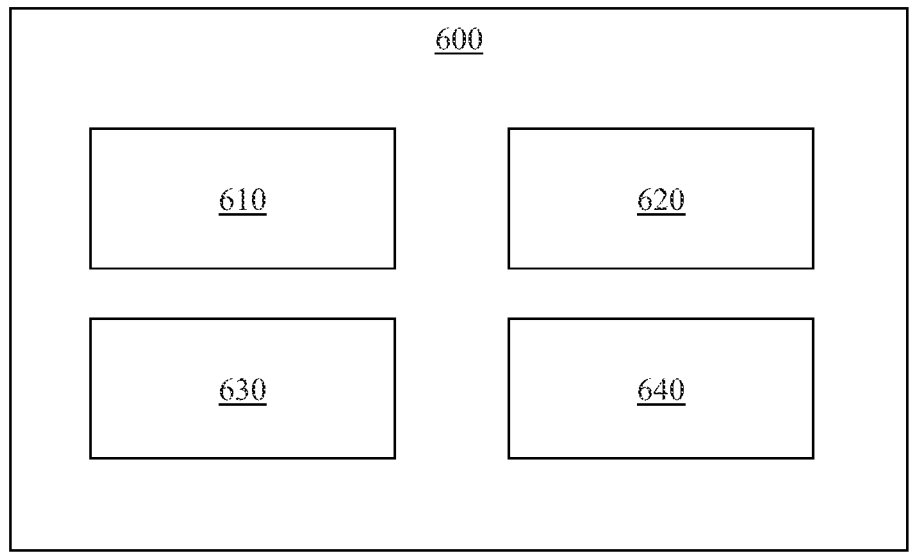
FIG. 6 illustrates an example system associated with the self-management of local resources allocated remotely.

FIG. 6 illustrates a system 600 associated with the self-management of local resources allocated remotely. System 600 includes several items similar to those described in connection with system 500 (FIG. 5). For example, system 600 includes a connection logic 610, a remote access logic 620, and a mapping logic 630. However, system 600 also includes an additional element. For example, system 600 includes a mapping data store 640. Mapping data store 640 may store persistent mappings provided to the mapping data store 640 by the mapping logic 630. In one example the persistent mappings may be crafted from data pushed to system 600 in response to a user action at a location. In another example, the persistent mapping may be crafted from data pulled by system 600 from a location in response to detecting a user reconfiguration at the location. The persistent mapping may be based on a user identifier and an MLI.

Figure 7:
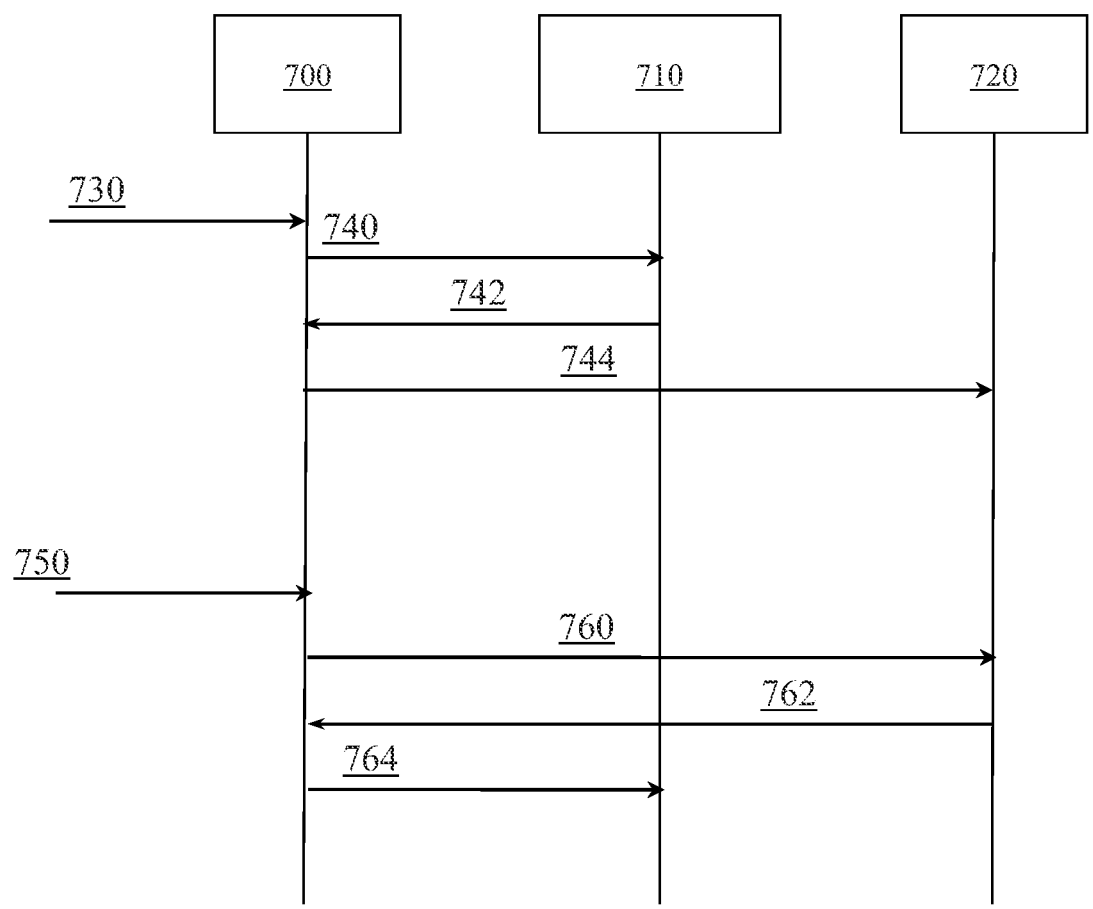
FIG. 7 illustrates an example message flow associated with the self-management of local resources allocated remotely.

FIG. 7 illustrates an example message flow associated with the self-management of local resources allocated remotely. Messages may flow between a connection client 700, a remote access client 710, and a server 720. While three separate devices are illustrated, it is to be appreciated that in different examples a greater and/or lesser number of devices may provide the functionality of the example systems and methods and thus that the message flow may be internal to a single device or may traverse a greater number of devices.

In one message flow, a user save action 730 is detected at connection client 700. User save action 730 may indicate that a user wants to save a layout that they have created at a location across a connection. Information concerning the layout may be stored in remote access client 710. Therefore, a get layouts message 740 may travel from connection client 700 to remote access client 710. The get layouts message 740 may ask for data (e.g., a mapping) associated with the user and the connection. In response to receiving the get layouts message 740, the remote access client 710 may provide a layout message 742. The layout message 742 may provide an identifier of a layout(s) with which a user is interacting. This may in turn prompt the connection client 700 to provide a save layouts message 744 to server 720. This message flow results in a capture of a user session and a persisting of data associated with that session in server 720.

In another message flow, a user connect action 750 is detected at connection client 700. User connect action 750 may indicate that a user would like to make a connection and, if a mapping is available, have that connection arrange displays based on previously saved layout information. In response to receiving the user connect 750, connection client 700 may provide a get layout message 760 to server 720. The get layout message 760 seeks to identify information associated with the user producing the user connect 750. If a layout is available, then server 720 may provide a layout message 762 that provides the layout information. This layout information may then be provided to remote access client 710 in a set layout message 764. One skilled in the art will appreciate that other message flows may be employed.

Figure 8:
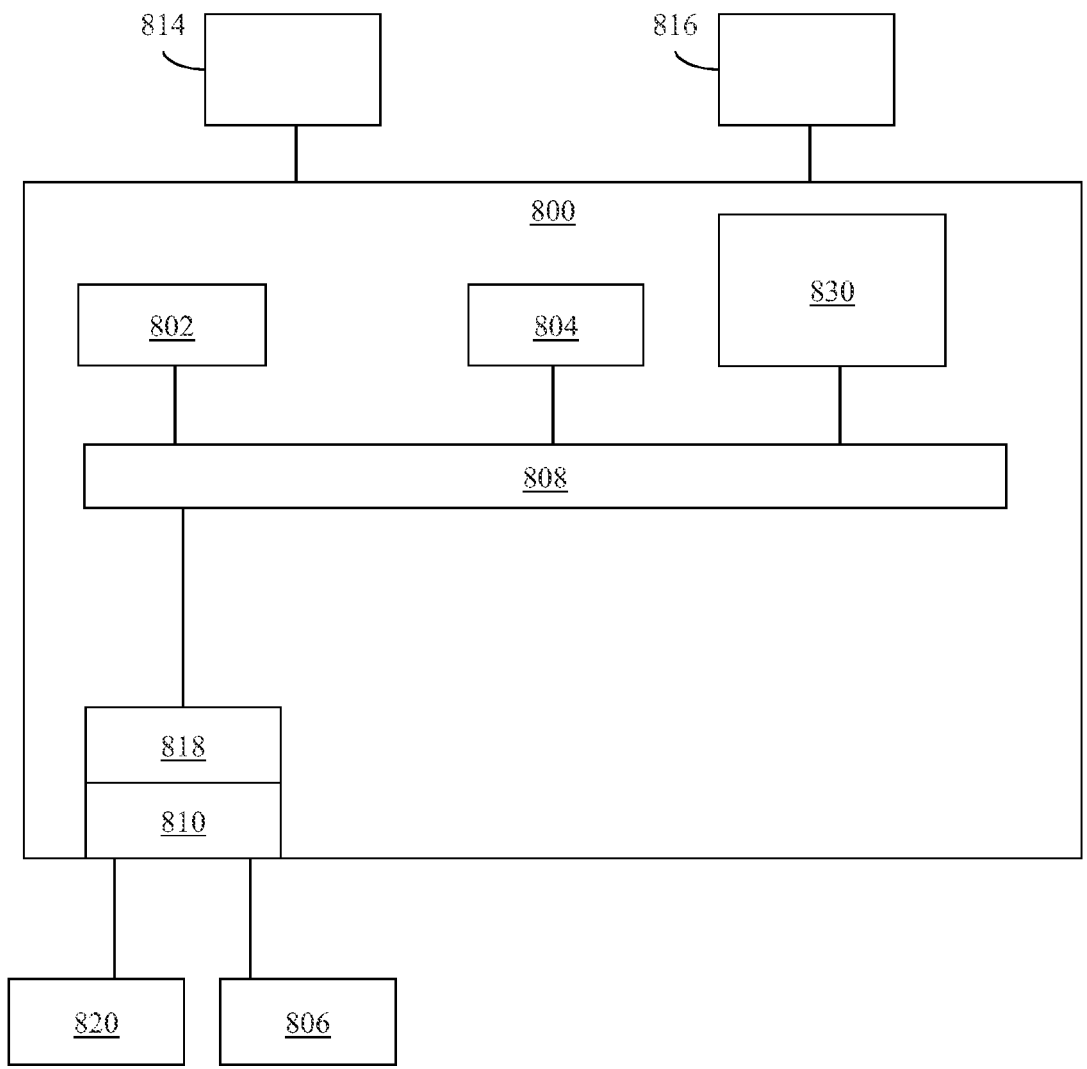
FIG. 8 illustrates an example computing environment in which example systems and methods, and equivalents, may operate.

FIG. 8 illustrates an example computing device in which example systems and methods described herein, and equivalents, may operate. The example computing device may be a computer 800 that includes a processor 802, a memory 804, and input/output ports 810 operably connected by a bus 808. In one example, the computer 800 may include a persistent mapping logic 830 configured to facilitate establishing, maintaining, and manipulating mappings that facilitate connecting M computers to N displays in a controllable configuration based, at least in part, on a per-user mapping relating the computers, displays, and users, M and N being integers. In different examples, the logic 830 may be implemented in hardware, software, firmware, and/or combinations thereof. While the logic 830 is illustrated as a hardware component attached to the bus 808, it is to be appreciated that in one example, the logic 830 could be implemented in the processor 802.

Thus, logic 830 may provide means (e.g., hardware, software, firmware) for persisting information concerning a relationship between a set of computer outputs, a set of computer displays, and a user arrangement of the set of computer outputs on the set of computer displays. The set of computer outputs are provided by a set of computers located remotely from the set of computer displays. At different times the different services may be provided by different computers. Logic 830 may also provide means (e.g., hardware, software, firmware) for controlling a per-user, per-session, per-location display of the set of computer outputs based, at least in part, on a value associated with persistent information. The means associated with logic 830 may be implemented, for example, as an ASIC programmed to control computer 800. The means may also be implemented as computer executable instructions that are presented to computer 800 as data 816 that are temporarily stored in memory 804 and then executed by processor 802 to control computer 800.

Generally describing an example configuration of the computer 800, the processor 802 may be a variety of various processors including dual microprocessor and other multi-processor architectures. A memory 804 may include volatile memory and/or non-volatile memory. Non-volatile memory may include, for example, ROM, PROM, and so on. Volatile memory may include, for example, RAM, SRAM, DRAM, and so on.

A disk 806 may be operably connected to the computer 800 via, for example, an input/output interface (e.g., card, device) 818 and an input/output port 810. The disk 806 may be, for example, a magnetic disk drive, a solid state disk drive, a floppy disk drive, a tape drive, a Zip drive, a flash memory card, a memory stick, and so on. Furthermore, the disk 806 may be a CD-ROM drive, a CD-R drive, a CD-RW drive, a DVD ROM drive, a Blu-Ray drive, an HD-DVD drive, and so on. The memory 804 can store a process 814 and/or a data 816, for example. The disk 806 and/or the memory 804 can store an operating system that controls and allocates resources of the computer 800.

The bus 808 may be a single internal bus interconnect architecture and/or other bus or mesh architectures. While a single bus is illustrated, it is to be appreciated that the computer 800 may communicate with various devices, logics, and peripherals using other busses (e.g., PCIE, 1394, USB, Ethernet). The bus 808 can be types including, for example, a memory bus, a memory controller, a peripheral bus, an external bus, a crossbar switch, and/or a local bus.

The computer 800 may interact with input/output devices via the i/o interfaces 818 and the input/output ports 810. Input/output devices may be, for example, a keyboard, a microphone; a pointing and selection device, cameras, video cards, displays, the disk 806, the network devices 820, and so on. The input/output ports 810 may include, for example, serial ports, parallel ports, and USB ports.

The computer 800 can operate in a network environment and thus may be connected to the network devices 820 via the i/o interfaces 818, and/or the i/o ports 810. Through the network devices 820, the computer 800 may interact with a network. Through the network, the computer 800 may be logically connected to remote computers. Networks with which the computer 800 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or including is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A, Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, ABC, AAA, AAB, AABB, AABBC, AABBCC, and so on (e.g., the data store may store only A, only B, only C, A&B, A&C, B&C, A&B&C, A&A&A, A&A&B, A&A&B&B, A&A&B&B&C, A&A&B&B&C&C, and so on). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed cause a system to:
    identify a set of services to provide a set of outputs to be displayed on a first set of displays at a first location to an identified user, where the services are provided by computers located remotely over a network from the first location;
    establish a value for a parameter that controls a custom display of a given output of the set of outputs on a respective set of displays to the identified user based, at least in part, on a stored mapping that persistently relates the set of services, the set of outputs, a second set of displays, and the identified user, where the stored mapping stores information concerning the parameter based on recording re-arranging positions of displayed elements of the given output by the identified user while previously viewing the given output of the set of outputs on the second set of displays at a second location different from the first location;
    adjust the display of the given output of the set of outputs on the first set of displays, the adjusting being based, at least in part, on the value of the parameter; and
    record a user-adjusted display configuration that includes the re-arranging of the positions of the displayed elements of the given output on the second set of displays at the second location, wherein the user-adjusted display configuration of the given output on the second set of displays determines a horizontal position and a vertical position of the given output on the second set of displays, wherein the recording of the re-arranging of the positions of the dis la ed elements of the given output comprises recording the re-arranging of the horizontal and vertical positions of the displayed elements of the given output, and wherein adjusting the display of the given output of the set of outputs on the first set of displays comprises adjusting a horizontal positon and a vertical positon of the given output on the first set of displays.

2. The non-transitory computer-readable medium of claim where the value for the parameter controls at least one item selected from the group consisting of a horizontal position of an output and a vertical position of an output.

3. The non-transitory computer-readable medium of claim 1, where the mapping includes an Extensible Markup Language (XML) attribute-value pair.

4. The non-transitory computer-readable medium of claim 1, wherein the instructions when executed cause the system to save the value for the parameter into the stored mapping in response to detecting a user control indication concerning saving the value for the parameter.

5. The non-transitory computer-readable medium of claim 1, wherein the instructions when executed cause the system to save the value for the parameter into the stored mapping in response to detecting the re-arranging of the positions of the displayed elements by the identified user while viewing the given output of the set of outputs on the second set of displays.

6. The non-transitory computer-readable medium of claim 1, wherein the instructions when executed cause the system to maintain a hierarchy of information concerning parameters associated with controlling the display of outputs on displays associated with identified users.

7. The non-transitory computer-readable medium of claim 1, where the parameter includes a monitor layout identifier, wherein different values of the monitor layout identifier correspond to different layouts for a display of an output.

8. The non-transitory computer-readable medium of claim where the given output of the set of outputs includes a set of graphical presentations produced by the computers, where the set of graphical presentations includes one or more of an application output, a gadget output, a widget output, a frame, and a window.

9. The non-transitory computer-readable medium of claim 1, wherein the user-adjusted display configuration of the given output on the second set of displays determines a width and a height of the given output on the second set of displays, and wherein adjusting the display of the given output of the set of outputs on the first set of displays comprises adjusting a width and a height of the given output on the first set of displays.

10. The non-transitory computer-readable medium of claim 1, where the value for the parameter further controls a width or a height of an output.

11. A system comprising:
    a processor; and
    a non-transitory storage medium storing instructions executable on the processor to:
        identify a connection to a set of services being requested by a user, the services provided by respective computers;
        identify a first set of physical displays upon which outputs of the set of services are to be displayed at a first location;
        determine values of a set of display parameters from a persistent mapping that relates the user, the set of services, and a second set of physical displays at a second location different from the first location, where the persistent mapping includes values of the set of display parameters based on recording re-arranging positions and sizes of displayed elements of the outputs of the set of services by the user while viewing the outputs of the set of services on the second set of physical displays at the second location;
        cause display of the outputs of the set of services on the first set of physical displays, according to the determined values of the set of display parameters; and
        record a user-adiusted display configuration that includes the re-arranging of the positions and the sizes of the dis la ed elements of the outputs of the set of services on the second set of physical displays at the second location, wherein the user-adiusted display configuration of the outputs of the set of services on the second set of physical displays determines a width and a height of the outputs of the set of services on the second set of displays, wherein the recording of the re-arranging of the sizes of the displayed elements of the outputs of the set of services comprises recording the re-arranging of the width and the height of the displayed elements of the outputs of the set of services, and wherein causing the display of the outputs of the set of services on the first set of physical displays comprises adjusting a width and a height of the outputs of the set of services on the first set of physical displays.

12. The system of claim 11, where the set of display parameters includes parameters selected from among a horizontal position parameter, a vertical position parameter, a width parameter, and a height parameter.

13. The system of claim 11, comprising a mapping data store to store the persistent mapping, wherein the instructions are executable on the processor to update the persistent mapping in response to receiving a control indication from the user.

14. The system of claim 11, wherein the user-adjusted display configuration of the outputs of the set of services on the second set of physical displays determines a horizontal position and a vertical position of the outputs of the set of services on the second set of physical displays, wherein the recording of the re-arranging of the positions of the displayed elements of the outputs of the set of services comprises recording the re-arranging of the horizontal and vertical positions of the displayed elements of the outputs of the set of services, and wherein causing the display of the outputs of the set of services on the first set of physical displays comprises adjusting a horizontal positon and a vertical positon of the outputs of the set of services on the first set of physical displays.

15. A method comprising:
 identifying, by a system comprising a processor, a set of services to provide a set of outputs to be displayed on a first set of physical displays at a first location to a user, where the services are provided by computers located remotely over a network from the first location;
 establishing, by the system, values of display parameters that control a custom display of a given output of the set of outputs on a respective set of physical displays to the user based, at least in part, on a stored mapping that persistently relates the set of services, a second set of physical displays, and the user, where the stored mapping stores information concerning the display parameters based on recording re-arranging positions of displayed elements of the given output by the user while previously viewing the given output of the set of outputs on the second set of physical displays at a second location different from the first location; adjusting, by the system, the display of the given output of the set of outputs on the first set of physical displays, the adjusting being based, at least in part, on the values of the display parameters; and
 recording, by the system, a user-adjusted display configuration that includes the re-arranging of the positions of the displayed elements of the given output on the second set of physical displays at the second location, wherein the user-adjusted display configuration of the riven out out on the second set of ohvsical dis la s determines a horizontal position and a vertical position of the given output on the second set of physical displays, wherein the recording of the re-arranging of the positions of the displayed elements of the given output comprises recording the re-arranging of the horizontal and vertical positions of the displayed elements of the given output, and wherein adjusting the display of the given output of the set of outputs on the first set of physical displays comprises adjusting a horizontal positon and a vertical positon of the given output on the first set of physical displays.

16. The method of claim 15, further comprising automatically updating the stored mapping in response to the user reconfiguring display of the given output on the first set of physical displays.

17. The method of claim 15, wherein the user-adjusted display configuration of the given output on the second set of physical displays determines a width and a height of the given output on the second set of physical displays, and wherein adjusting the display of the given output of the set of outputs on the first set of physical displays comprises adjusting a width and a height of the given output on the first set of physical displays.

* * * * *

UNITED STATES PATENT AND TRADEMARK OFFICE
CERTIFICATE OF CORRECTION

PATENT NO. : 9,860,344 B2
APPLICATION NO. : 13/000622
DATED : January 2, 2018
INVENTOR(S) : Jeffrey Joel Walls et al.

Page 1 of 2

It is certified that error appears in the above-identified patent and that said Letters Patent is hereby corrected as shown below:

On the Title Page

Item (75), Inventors, in Column 1, Line 1, delete "F. Collins" and insert -- Ft. Collins --, therefor.

Item (75), Inventors, in Column 1, Line 2, delete "F. Collins" and insert -- Ft. Collins --, therefor.

In the Claims

In Column 15, Line 34, in Claim 1, delete "dis la ed" and insert -- displayed --, therefor.

In Column 15, Line 40, in Claim 1, delete "positon" and insert -- position --, therefor.

In Column 15, Line 40, in Claim 1, delete "positon" and insert -- position --, therefor.

In Column 15, Line 42, in Claim 2, delete "claim" and insert -- claim 1, --, therefor.

In Column 16, Line 3, in Claim 8, delete "claim" and insert -- claim 1, --, therefor.

In Column 16, Line 44, in Claim 11, delete "user-adiusted" and insert -- user-adjusted --, therefor.

In Column 16, Line 46, in Claim 11, delete "dis la ed" and insert -- displayed --, therefor.

In Column 16, Line 48, in Claim 11, delete "user-adiusted" and insert -- user-adjusted --, therefor.

In Column 17, Line 15, in Claim 14, delete "positon" and insert -- position --, therefor.

In Column 17, Line 16, in Claim 14, delete "positon" and insert -- position --, therefor.

In Column 18, Line 10, in Claim 15, delete "riven" and insert -- given --, therefor.

Signed and Sealed this
Ninth Day of October, 2018

Andrei Iancu
*Director of the United States Patent and Trademark Office*

CERTIFICATE OF CORRECTION (continued)
U.S. Pat. No. 9,860,344 B2

In Column 18, Line 10, in Claim 15, delete "out out" and insert -- output --, therefor.

In Column 18, Line 10, in Claim 15, delete "ohvsical" and insert -- physical --, therefor.

In Column 18, Line 10, in Claim 15, delete "dis la s" and insert -- displays --, therefor.

In Column 18, Line 20, in Claim 15, delete "positon" and insert -- position --, therefor.

In Column 18, Line 20, in Claim 15, delete "positon" and insert -- position --, therefor.